(12) United States Patent
Lee

(10) Patent No.: US 10,324,541 B2
(45) Date of Patent: Jun. 18, 2019

(54) MOUSE WITH ADJUSTABLE ANGLE

(71) Applicant: Jae Wook Lee, Seoul (KR)

(72) Inventor: Jae Wook Lee, Seoul (KR)

( * ) Notice: Subject to any disclaimer, the term of this patent is extended or adjusted under 35 U.S.C. 154(b) by 0 days.

(21) Appl. No.: 15/550,170

(22) PCT Filed: Jun. 24, 2016

(86) PCT No.: PCT/KR2016/006787
§ 371 (c)(1),
(2) Date: Aug. 10, 2017

(87) PCT Pub. No.: WO2017/052038
PCT Pub. Date: Mar. 30, 2017

(65) Prior Publication Data
US 2018/0239447 A1    Aug. 23, 2018

(30) Foreign Application Priority Data

Sep. 26, 2015  (KR) .................. 10-2015-0137170
Dec. 8, 2015   (KR) .................. 10-2015-0174119

(51) Int. Cl.
*G06F 3/0354* (2013.01)
*G06F 1/16* (2006.01)

(52) U.S. Cl.
CPC ........ *G06F 3/03543* (2013.01); *G06F 1/1656* (2013.01); *G06F 3/0354* (2013.01); *G06F 3/03541* (2013.01); *G06F 2203/0333* (2013.01); *G06F 2203/0334* (2013.01)

(58) Field of Classification Search
CPC ... G06F 3/033; G06F 3/03541; G06F 3/03543
See application file for complete search history.

(56) References Cited

U.S. PATENT DOCUMENTS

| | | | |
|---|---|---|---|
| 5,260,696 A * | 11/1993 | Maynard, Jr. | G06F 3/03543 345/157 |
| 5,870,081 A * | 2/1999 | Wu | G06F 3/03543 345/163 |
| 5,936,612 A * | 8/1999 | Wang | G06F 3/0312 345/163 |
| 6,323,843 B2 * | 11/2001 | Giles | G06F 3/03543 345/163 |

(Continued)

FOREIGN PATENT DOCUMENTS

| | | |
|---|---|---|
| KR | 10-2009-0020839 | 2/2009 |
| KR | 10-2010-0062039 | 6/2010 |
| KR | 10-1374881 | 3/2014 |

*Primary Examiner* — Adrian S Wilson
(74) *Attorney, Agent, or Firm* — Lex IP Meister, PLLC

(57) ABSTRACT

A mouse with an adjustable angle includes an internal body coupled to an upper portion of the lower body in an inner space of the upper body, a plurality of angle adjusting bodies coupled to the upper portion of the lower body to surround the internal body or another angle adjusting body and having one end fixedly coupled to the lower body and the other end detachably coupled to the lower body, and an upper body formed above the lower body so as to surround an angle adjusting body formed at an outermost portion among the angle adjusting bodies and having one end fixedly coupled to the lower body and the other end detachably coupled to the lower body.

22 Claims, 18 Drawing Sheets

(56) References Cited

U.S. PATENT DOCUMENTS

| | | | |
|---|---|---|---|
| 6,727,889 B2* | 4/2004 | Shaw | G06F 3/0338 |
| | | | 345/161 |
| 7,109,972 B2 | 9/2006 | Fu | |
| 7,623,117 B2 | 11/2009 | Hsu | |
| 9,569,014 B2* | 2/2017 | Drougge | G06F 3/03543 |
| 9,772,695 B2* | 9/2017 | Wang | G06F 3/03543 |
| 2003/0058219 A1* | 3/2003 | Shaw | G06F 3/0338 |
| | | | 345/161 |
| 2005/0030278 A1* | 2/2005 | Fu | G06F 3/033 |
| | | | 345/156 |

* cited by examiner

MOUSE WITH ADJUSTABLE ANGLE

TECHNICAL FIELD

The present invention relates to a computer mouse, and more particularly, to a mouser with an adjustable angle, for adjusting and using the mouse a desired angle.

BACKGROUND ART

In order to use a mouse with a typical design and function, a user needs to fold his or her wrist to the left or right during use of the mouse and, thus, in the case of long-time use, carpal tunnel syndrome with pain in the wrist is caused due to narrow wrist ligament or twisted muscles.

In order to prevent the wrist from being folded, a mouse similar to a joystick with the wrist being perpendicular or tilted to a floor surface may be used. However, a joystick type mouse has been used with a low using ratio and most users have used a typical type mouse because the joystick type mouse does not satisfy the needs of users who prefer the typical type mouse and users are inconvenienced by using a mouse that has not be used thus far.

DISCLOSURE

Technical Problem

An object of the present invention devised to solve the problem lies on a mouser with an adjustable angle, for adjusting and using the mouse in a desired angle.

Technical Solution

The object of the present invention can be achieved by providing a mouse with an adjustable angle including a lower body that contacts a floor surface and an upper body that is coupled to an upper surface of the lower body so as to be held by a user hand, the mouse including an internal body coupled to an upper portion of the lower body in an inner space of the upper body, at least one angle adjusting body coupled to the upper portion of the lower body to surround the internal body and having one end fixedly coupled to the lower body and the other end detachably coupled to the lower body, and the upper body formed above the lower body to surround the at least one angle adjusting body and having one end fixedly coupled to the lower body and the other end detachably coupled to the lower body. When the angle of the mouse is adjusted, while the other end of the upper body or the angle adjusting body is separated from the lower body to adjust a height of the mouse, the other end of the upper body or the angle adjusting body is coupled to the angle adjusting body or the internal body that is formed inside the upper body or the angle adjusting body.

The at least one angle adjusting body may be coupled to an upper portion of the lower body while surrounding an external side of the internal body or surrounding an external side of another angle adjusting body and the upper body may be coupled to the upper portion of the lower body while surrounding an angle adjusting body formed at an outermost portion among the at least one angle adjusting body.

The coupler may include a projection formed inside the upper body and the other end of the angle adjusting body and a plurality of protrusions formed outside the internal body and the other end of angle adjusting body so as to catch and fix the projection of the angle adjusting body or the upper body.

The protrusions may include at least one first protrusion for supporting the projection so as not to fall toward the lower body when the angle adjusting body or the upper body is lifted, and at least one second protrusion for preventing the projection from being separated upward when the angle adjusting body or the upper body is lifted, and the second protrusion may be positioned above the first protrusion and an interval between the first protrusion and the second protrusion is the same as a height of the projection or greater than the height of the projection.

The protrusions may further include a fixing protrusion for preventing the projection from being separated upward while the angle adjusting body or the upper body contacts the lower body when the angle adjusting body or the upper body is not lifted.

Portions of the upper body, the angle adjusting body, and the internal body, which are to be coupled to the internal body, may be formed of a flexible material so as to change a coupling angle between the upper body, the angle adjusting body, or the internal body and the lower body when the angle of the mouse is adjusted.

The internal body and the angle adjusting body may be formed to surround an entire portion or partial portion of an internal side of the upper body.

The lower body may further include at least one of a pushing portion formed to extend on the lower body in an outward direction of one end of the upper body and a support formed to extend on the lower body in an outward direction of the other end of the upper body.

The mouse may further include a first height adjuster formed toward the other end of the upper body from one end, having one end coupled to an internal side in a direction of the other end of the upper body, and inclined in an upward direction of the lower body, and a second height adjuster having one end coupled to the other end of the first height adjuster and the other end protruding out of the upper body, wherein, when the other end of the second height adjuster is moved between one end and the other end of the upper body, the other end of the first height adjuster may be moved up and down so as to move the upper body in an upward direction or a downward direction.

The first height adjuster may include a plurality of grooves formed on an upper surface thereof.

The mouse may further include a first height adjuster formed toward the other end of the upper body from one end, having one end coupled to an internal side in a direction of the other end of the upper body, and inclined in an upward direction of the lower body, a second height adjuster having one end coupled to the other end of the first height adjuster and coupled to an upper portion of the lower body so as to be moveable between one end and the other end of the upper body, and a third height adjuster having one end coupled to the other end of the second height adjuster and the other end protruding out of the upper body and controlling the second height adjuster to be moved between one end and the other end of the upper body using the other end that protrudes out of the upper body, wherein, when the second height adjuster is moved between one end and the other end of the upper body using the third height adjuster, the other end of the first height adjuster may be moved up and down so as to move the upper body in an upward direction or a downward direction.

The third height adjuster may be a rotating screw that rotates at the same position, and the second height adjuster may be a moving screw that is engaged with an upper surface of the rotating screw and moved between one end and the other end of the upper body when the rotating screw rotates.

Advantageous Effects

When a mouse with an adjustable angle according to an embodiment of the present invention is used, an angle of the mouse may be adjusted at an angle desired by a user via simple manipulation and, thus, even if a typical type mouse is used and used for a long time, the angle may be adjusted in a comfortable state for the wrist, thereby preventing fatigue of wrist joint. In addition, when a mouse with an adjustable angle according to an embodiment of the present invention is used, an angle of the mouse may be adjusted to an angle of 150 or 160 degrees from 0 degrees in which the angle is not adjusted and, thus, a range for angle adjustment to be selected by a user is very wide so as to satisfy all needs of users.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
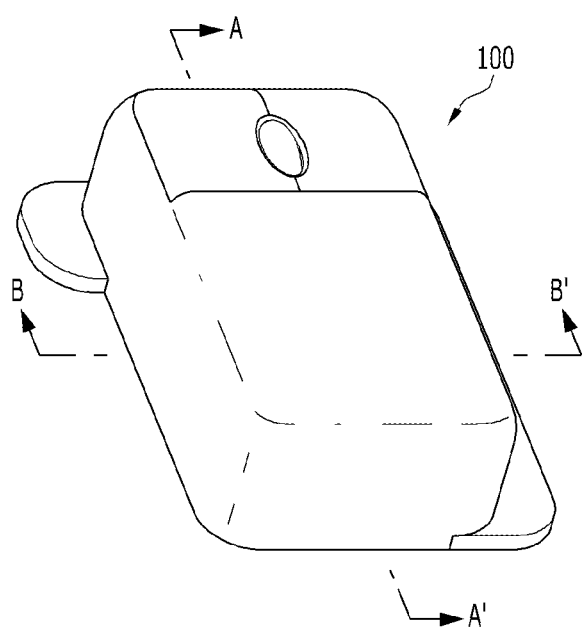
FIG. 1 is a perspective view of a mouse with an adjustable angle according to an embodiment of the present invention.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 2:
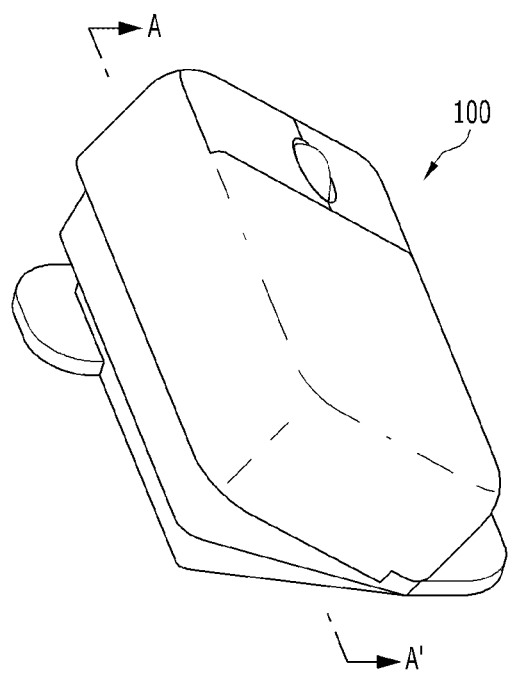
FIG. 2 is a perspective view illustrating the case in which an angle of the mouse illustrated in FIG. 1 is adjusted according to an embodiment of the present invention.
Figure 3:
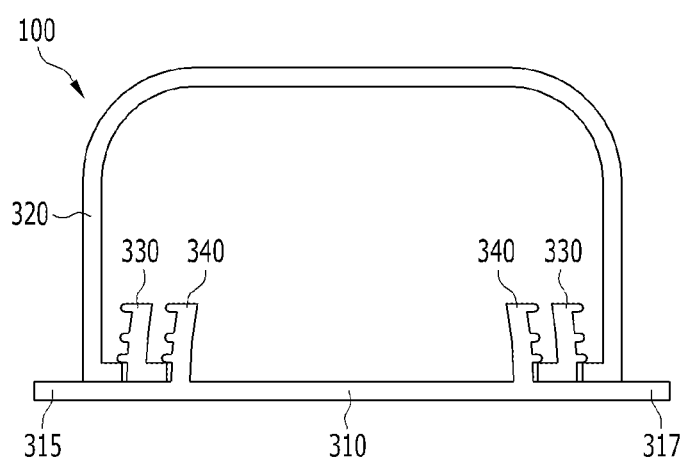
FIGS. 3 to 5 are vertical cross-sectional views of the mouse illustrated in FIG. 1 taken in a direction A-A' for explanation of an operation of adjusting an angle of the mouse.
Figure 4:
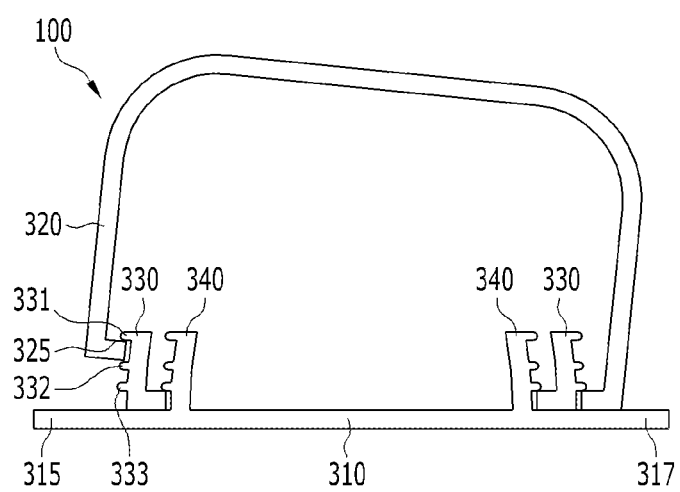
Figure 5:
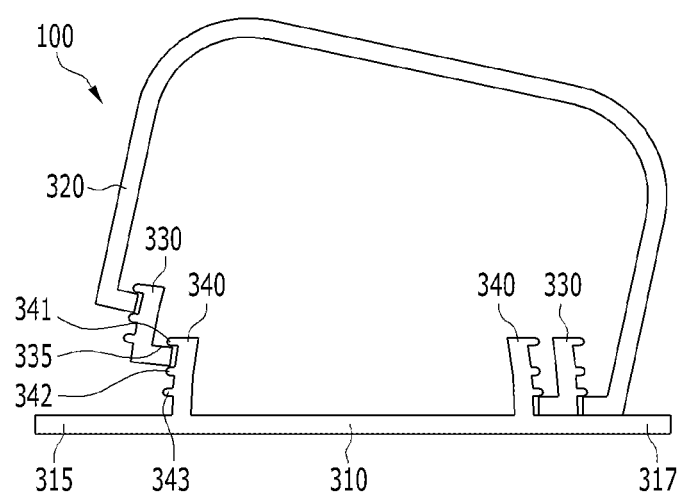
Figure 6:
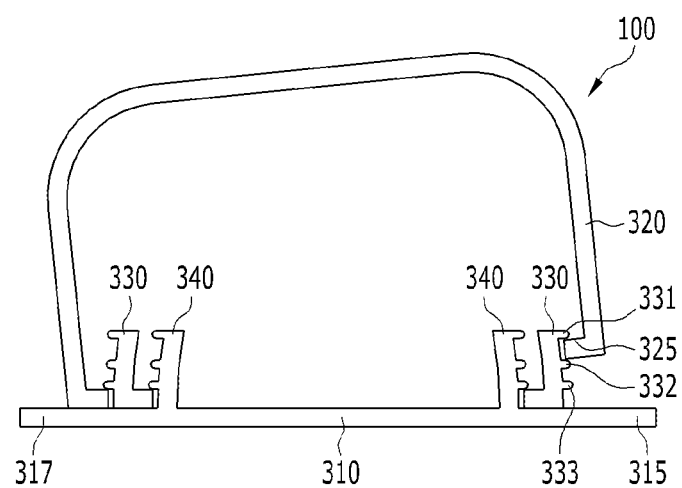
FIG. 6 is a horizontal cross-sectional view of the mouse illustrated in FIG. 1 taken in a direction B-B'.

FIG. 1 is a perspective view of a mouse 100 with an adjustable angle according to an embodiment of the present invention. FIG. 2 is a perspective view illustrating the case in which an angle of the mouse 100 illustrated in FIG. 1 is adjusted according to an embodiment of the present invention. FIGS. 3 to 5 are vertical cross-sectional views of the mouse 100 illustrated in FIG. 1 taken in a direction A-A' for explanation of an operation of adjusting an angle of the mouse 100. FIG. 6 is a horizontal cross-sectional view of the mouse 100 illustrated in FIG. 1 taken in a direction B-B'.

Referring to FIGS. 1 to 6, the mouse 100 according to an embodiment of the present invention may include a lower body 310 that contacts a floor surface and an upper body 320 that is coupled to an upper surface of the lower body 310 so as to be held by the user hand. In addition, the mouse 100 may include an internal body 340 and at least one angle adjusting body 330. For convenience of description, although FIGS. 3 to 6 illustrate the case in which the mouse 100 includes one angle adjusting body 330, the present invention is not limited thereto and, thus, in order to variously subdivide an angle adjusting operating or widen an adjusted angle, the mouse 100 may include one or more angle adjusting bodies 330.

Hereinafter, only components for adjusting an angle using the mouse 100 will be described and other components for performing a function of a mouse employ general components and, thus, the components for performing the function of a mouse will not be described here.

The lower body 310 may be a portion that contacts a floor surface and the upper body 320 may be a portion that is coupled to an upper surface of the lower body 310 such that a user holds the portion with the hand or puts the hand on the portion and uses the mouse 100. The upper body 320 may be a portion that surrounds an entire portion of the lower body 310 and an external surface of the upper body 320 may be externally exposed.

The internal body 340 may be coupled to an upper portion of the lower body 310 in an inner space of the upper body 320. The internal body 340 may be fixedly coupled to an upper portion of the lower body 310 and, for example, may extend and may be integrated into the upper portion of the lower body 310.

At least one angle adjusting body 330 may be coupled to the upper portion of the lower body 310 while externally surrounding the internal body 340. One end (a right end portion of FIGS. 3 to 5) of the angle adjusting body 330 may be fixedly coupled to the lower body 310 and the other end (a left end portion FIGS. 3 to 5) of the angle adjusting body 330 is detachably coupled to the lower body 310.

The upper body 320 may be coupled to the upper portion of the lower body 310 while surrounding at least one angle adjusting body 330. Like the angle adjusting body 330, one end (a right end portion of FIGS. 3 to 5) of the upper body 320 may be fixedly coupled to the lower body 310 and the other end (a left end portion of FIGS. 3 to 5) of the upper body 320 may be detachably coupled to the lower body 310. One end of the upper body 320 may correspond to one end of the angle adjusting body 330 and the other end of the upper body 320 may correspond to the other end of the angle adjusting body 330.

The angle adjusting body 330 may be coupled to the lower body 310 while externally surrounding the internal body 340 or externally surrounding another angle adjusting body and the upper body 320 may be coupled to the upper portion of the lower body 310 while surrounding the angle adjusting body 330 that is formed at the outermost portion among at least one angle adjusting body 330. For example, when the mouse 100 includes two angle adjusting bodies 330 (a first angle adjusting body and a second angle adjusting body), the first angle adjusting body may be coupled to the upper portion of the lower body 310 while externally surrounding the internal body 340, the second angle adjusting body may be coupled to the upper portion of the lower body 310 while surrounding the first angle adjusting body, and the upper body 320 may be coupled to the upper portion of the lower body 310 while surrounding the second angle adjusting body.

As the other end of the upper body 320 and the angle adjusting body 330 is moved upward and is fixed based on the one end of the upper body 320 and the angle adjusting body 330, an angle of the mouse 100 may be adjusted. That is, when the angle of the mouse 100 is adjusted, the other end of the upper body or the angle adjusting body is separated from the lower body so as to adjust a height of the mouse and, in this state, the other end may be coupled to the angle adjusting body or the internal body which is formed inside the upper body or the angle adjusting body through a coupler. For example, when the angle is primarily adjusted in a state of FIG. 3, the other end of the upper body 320 is separated from the lower body 310 so as to adjust the height of the mouse and, in this state, the other end of the upper body 320 may be coupled to the angle adjusting body 330 through couplers 325, 331, and 332 so as to adjust the angle, as illustrated in FIG. 4. In addition, when the angle is secondarily adjusted in a state of FIG. 4, the other end of the angle adjusting body 330 is separated from the lower body 310 so as to adjust the height of the mouse and, in this state, the other end of the angle adjusting body 330 may be coupled to the internal body 340 through couplers 335, 341, and 342 so as to adjust the angle, as illustrated in FIG. 5. Although FIGS. 3 to 5 illustrate the case in which the angle is adjusted via two steps while the angle is not adjusted, embodiments of the present invention are not limited thereto and, thus, the number of angle adjusting bodies 330 may be added so as to adjust the angle via various steps. As illustrated in FIGS. 3 to 5, the upper body 320, the internal body 340, and the angle adjusting body 330 may be formed in such a way that a vertical-direction body is bent with a predetermined curvature so as to adjust the angle of the mouse 100 as the upper body 320 and the angle adjusting body 330 are moved upward.

The coupler may include projections 325 and 335 and a plurality of protrusions 331, 332, 333, 341, 342, and 343. The projections 325 and 335 may be formed to protrude inside the other end of the upper body 320 or the angle adjusting body 330. The plurality of protrusions 331, 332, 333, 341, 342, and 343 may be formed to protrude outside the other end of the angle adjusting body 330 or the internal body 340 so as to catch and fix the projections 325 and 335 of the upper body 320 or the angle adjusting body 330. For example, like in an embodiment of FIGS. 4 and 5, the projection 325 may be formed to protrude inside the other end of the upper body 320 and the projection 335 may be formed to protrude inside the other end of the angle adjusting body 330. In addition, the plurality of protrusions 331 and 332 may be formed to protrude outside the other end of the angle adjusting body 330 so as to catch and fix the projection 325 of the upper body 320 and the plurality of protrusions 341 and 342 may be formed outside the other end of the internal body 340 so as to catch and fix the projection 335 of the angle adjusting body 330. The protrusions 331, 332, 341, and 342 may include first protrusions 332 and 342, for supporting the projections 325 and 335 so as to prevent the projections 325 and 335 from falling toward the lower body 310 when the angle adjusting body 330 or the upper body 320 is lifted, and second protrusions 331 and 341 for preventing the projections 325 and 335 from being separated upward when the angle adjusting body 330 or the upper body 320 is lifted. That is, the first protrusions 332 and 342 may support the projections 325 and 335 so as not to fall toward the lower body 310. In addition, the second protrusions 331 and 341 may prevent the projections 325 and 335 from being separated when the upper body 320 or the angle adjusting body 330 is lifted upward (an upward direction in FIGS. 3 to 5). The second protrusions 331 and 341 may be positioned above the first protrusions 332 and 342 and an interval between the first protrusions 332 and 342 and the second protrusions 331 and 341 may be the same as the height of the projections 325 and 335 or greater than the height of the projections 325 and 335.

In addition, the protrusions 333 and 343 may include fixing protrusions 333 and 343 for preventing the projections 325 and 335 from being separated upward while the angle adjusting body 330 or the upper body 320 contacts the lower body 310 when the angle adjusting body 330 or the upper body 320 is not lifted. That is, when force for allowing the projections 325 and 335 to be separated from the fixing protrusions 333 and 343 is not applied while the angle adjusting body 330 or the upper body 320 contacts the lower body 310, the projections 325 and 335 may not be moved upward due to the fixing protrusions 333 and 343 and, thus, the angle adjusting body 330 or the upper body 320 may be maintained to contact the lower body 310. For example, as illustrated in FIG. 3, when the projection 325 of the upper body 320 is positioned below the fixing protrusion 333 of the projection 325 and the projection 335 of the angle adjusting body 330 is positioned below the fixing protrusion 334, both the upper body 320 and the angle adjusting body 330 may be fixedly coupled to the lower body 310. In addition, as illustrated in FIG. 4, the projection 325 of the upper body 320 may be moved upward to be positioned above the fixing protrusion 333 or, as illustrated in FIG. 5, the projection 335 of the angle adjusting body 330 as well as the projection 325 of the upper body 320 may also be moved upward to be positioned above the fixing protrusion 343. As such, when the projections 325 and 335 are moved above the fixing protrusions 333 and 343, the angle of the mouse 100 may be adjusted.

Portions of the upper body 320, the angle adjusting body 330, and the internal body 340, which are to be coupled to the lower body 310, may be formed of a flexible material, e.g., soft plastic so as to change a coupling angle between the upper body 320, the angle adjusting body 330, or the internal body 340 and the lower body 310 during adjustment of the angle of the mouse 100. As illustrated in FIG. 4 or 5, when the angle of the mouse 100 is adjusted, an angle between the lower body 310 and the upper body 320, an angle between the lower body 310 and the angle adjusting body 330, and an angle between the lower body 310 and the internal body 340 are continuously changed as illustrated in a right portion of the drawing, the portions of the upper body 320, the angle adjusting body 330, and the internal body 340, which are to be coupled to the lower body 310, may be formed of a flexible material. In addition, when the angle of the mouse 100 is adjusted, the portions of the upper body 320, the angle adjusting body 330, and the internal body 340, which are to be coupled to the lower body 310, may be formed with a smaller size than other portions so as to prevent the upper body 320, the angle adjusting body 330, and the internal body 340 from contacting the upper body 320 or the angle adjusting body 330 which is adjacent thereto as the upper body 320, the angle adjusting body 330, and the internal body 340 are tilted. For example, the portions of the upper body 320, the angle adjusting body 330, and the internal body 340, which are to be coupled to the lower body 310, may be formed with a lower height than portions (left portions of FIGS. 3 to 5) of the upper body 320, the angle adjusting body 330, and the internal body 340, which are not to be coupled to the lower body 310.

Even if the portions of the upper body 320, the angle adjusting body 330, and the internal body 340, which are to be coupled to the lower body 310, are not formed of a flexible material, a fixing element (e.g., a pin and a screw) that protrudes in a non-parallel direction to an internal surface of the upper body 320 may be formed at one end of the upper body 320 and the angle adjusting body 330 and the internal body 340 may be fixedly coupled to the fixing element. As such, since the upper body 320, the angle adjusting body 330, and the internal body 340 are coupled using the fixing element, an opposite portion to a lifted portion of the angle adjusting body 330 or the upper body 320 may be fixed by the fixing element during adjustment of the angle, the angle of the mouse 100 may be adjusted.

In addition, when the angle of the mouse 100 is adjusted, grooves may be formed in portions of vertical-direction bodies of the upper body 320, the angle adjusting body 330, and the internal body 340, which are to be coupled to the lower body 310, in order to prevent force being applied to the lower body 310 as the upper body 320, the angle adjusting body 330, and the internal body 340 are tilted, as illustrated in FIGS. 3 to 5.

As described above, in order to more easily adjust the angle of the mouse 100 with an adjustable angle according to an embodiment of the present invention, the lower body 310 may include a pushing portion 315 that is formed to extend on the lower body 310 in an outward direction of one end of the upper body 320. For example, when a user wants to adjust the angle of the mouse 100, the user may lift the upper body 320 or the angle adjusting body 330 in an upward direction while applying pressure to the pushing portion 315 toward a floor surface so as to easily adjust the angle. In addition, the lower body 310 may further include a support 317 that is formed to extend on the lower body 310 in an outward direction of the other end of the upper body 320. The support 317 may be a portion for putting the hand thereon when a mouse with an adjusted angle is used. The pushing portion 315 or the support 317 may be optionally formed on the lower body 310, may be integrated into the lower body 310, or may be detachably formed on the lower body 310.

Figure 7:
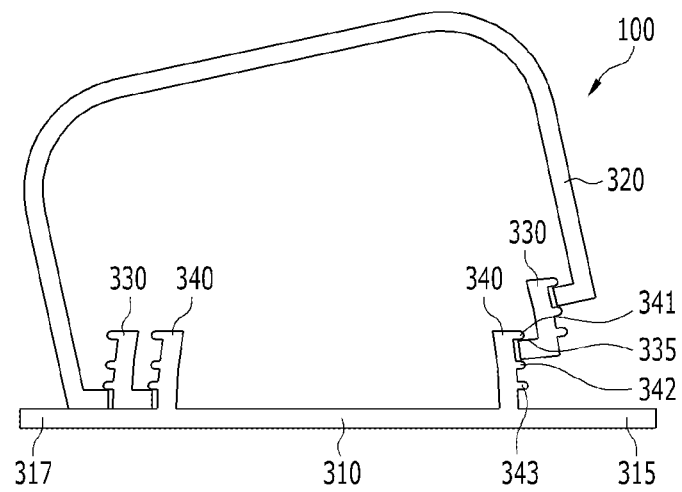
FIGS. 7 and 8 are horizontal cross-sectional views for explanation of a mouse with an adjustable angle according to another embodiment of the present invention.
Figure 8:
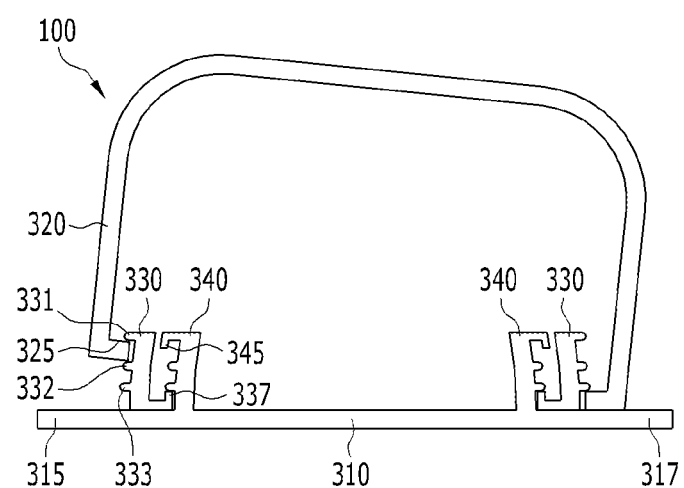
Figure 9:
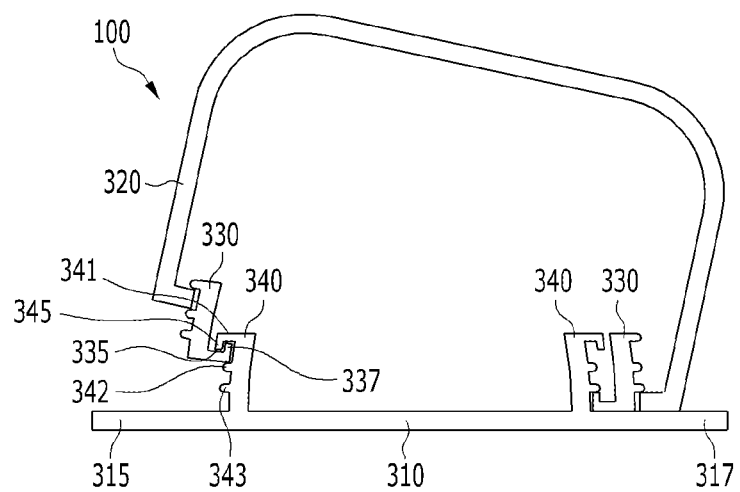
FIGS. 9 and 10 are vertical cross-sectional views for explanation of the mouse of FIGS. 7 and 8.
Figure 10:
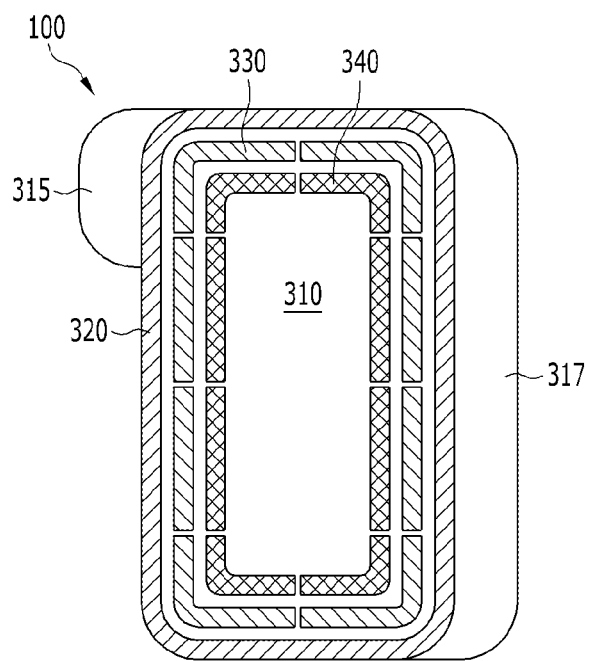

FIGS. 7 and 8 are horizontal cross-sectional views for explanation of a mouse 100' with an adjustable angle according to another embodiment of the present invention. FIGS. 9 and 10 are vertical cross-sectional views for explanation of the mouse 100' of FIGS. 7 and 8.

Referring to FIGS. 1 to 10, the mouse 100' of FIGS. 7 to 10 may be formed by adding a first height adjuster 710 and a second height adjuster 720 to the mouse 100 described with reference to FIGS. 1 to 6. That is, the configuration of the mouse 100' is similar to the mouse 100 described with reference to FIGS. 1 to 6 except for the first height adjuster 710 and the second height adjuster 720 and, thus, a repeated description will not be given hereinafter.

The first height adjuster 710 may be formed to extend toward the other end of the upper body 320 from one end, may have one end coupled to an internal side in a direction of the other end of the upper body 320, and may be inclined in an upward direction of the lower body 310. The second height adjuster 720 may have one end coupled to the other end of the first height adjuster 710 and have the other end that protrudes out of the upper body 320. By virtue of the first and second height adjusters 710 and 720 with this configuration, the angle of the mouse 100' may be adjusted. That is, when the other end of the second height adjuster 720 is moved between one end and the other end of the upper body 320, the other end of the first height adjuster 710 may be moved up and down so as to move the upper body 320 in an upward direction or a downward direction. One end and the other end of the second height adjuster 720 may be moved in opposite directions based on a fixing shaft positioned at a predetermined position. For example, when the other end of the second height adjuster 720 is moved to the left based on FIG. 7, one end of the second height adjuster 720 may be moved to the right, and when one end of the second height adjuster 720 is moved to the right based on FIG. 7, the other end of the second height adjuster 720 may be moved to the left.

For example, FIGS. 7 and 9 illustrate a state in which the angle of the mouse 100' is not adjusted and FIGS. 8 and 10 illustrate a state in which the angle of the mouse 100' is adjusted. First, referring to FIGS. 7 and 9, the other end of the second height adjuster 720 may be positioned in a direction (a left direction of FIG. 7) of the other end of the upper body 320, and the first height adjuster 710 connected to one end of the second height adjuster 720 may maintain an angle between the first height adjuster 710 and the lower body 310 as a minimum angle, as illustrated in FIG. 9. In this state, in order to adjust the angle of the mouse 100', when the other end of the second height adjuster 720 is moved in a direction (a right direction in FIG. 7 or 8) of one end of the upper body 320, the first height adjuster 710 connected to one end of the second height adjuster 720 may be moved upward so as to move the upper body 320 upward. In addition, when the upper body 320 is coupled to the angle adjusting body 330 through a coupler and then the first height adjuster 710 is continuously moved upward, the angle adjusting body 330 coupled to the upper body 320 may be moved upward. Accordingly, the angle adjusting body 330 as well as the upper body 320 may be moved upward by moving the upper body 320 upward using the first height adjuster 710 and the second height adjuster 720 and, thus, the mouse 100' may be adjusted and used at a desired angle.

The first height adjuster 710 may include a plurality of grooves formed on an upper surface thereof and formed of a flexible material. As such, since the first height adjuster 710 includes the grooves formed on the upper surface thereof and formed of a flexible material, when one end of the first height adjuster 710 is moved upward, the upper body 320 may be moved upward as an interval between the grooves formed on the upper surface of the first height adjuster 710 is narrowed.

In the embodiment of FIGS. 1 to 6, when the angle of the mouse 100 is adjusted, the upper body 320 or the angle adjusting body 330 may not be maintained with an adjusted angle and may fall toward the lower body 310 and, thus, the first protrusions 332 and 342 may be formed. However, in the case of the embodiment of FIGS. 7 to 10, the height of the upper body 320 and the angle adjusting body 330 may be adjusted using the first height adjuster 710 and the second height adjuster 720 and the state in which the height is adjusted may be fixed by the first height adjuster 710 and the second height adjuster 720 and, thus, the angle adjusting body 330 and the internal body 340 may include the first protrusions 332 and 342 of FIGS. 1 to 6 but the first protrusions 332 and 342 may be omitted as illustrated in FIGS. 7 to 10.

Figure 11:
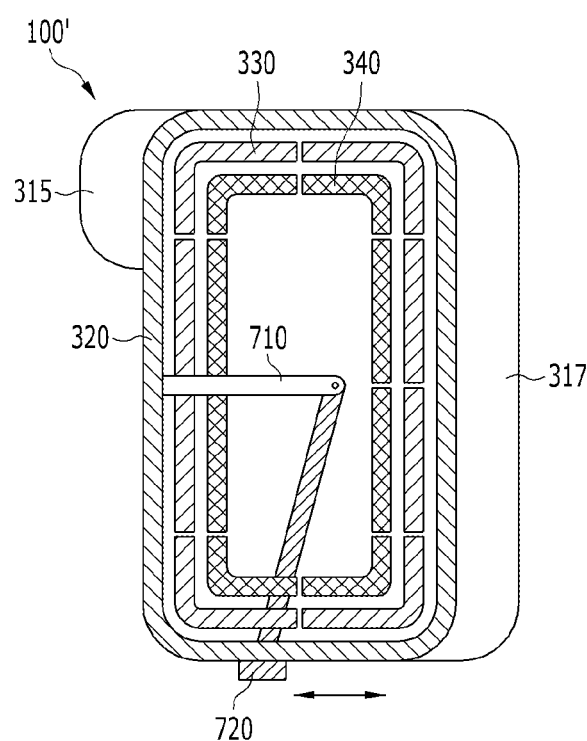
FIGS. 11 and 12 are horizontal cross-sectional views for explanation of a mouse with an adjustable angle according to another embodiment of the present invention.
Figure 12:
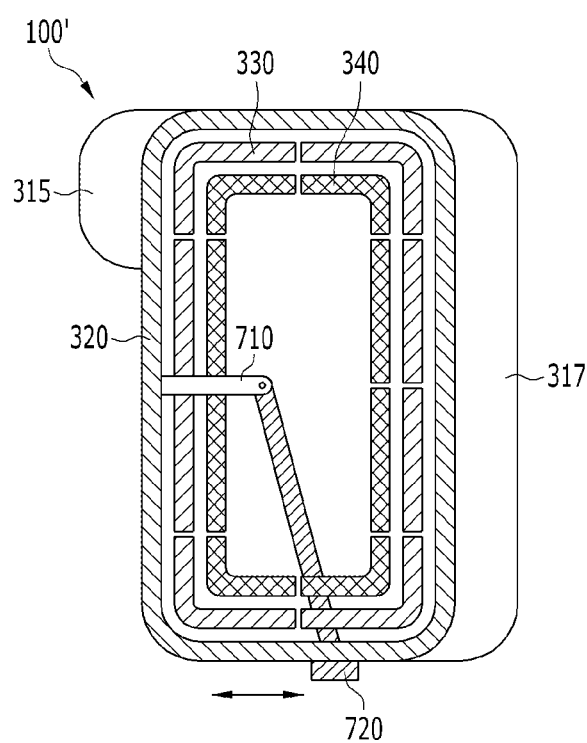
Figure 13:
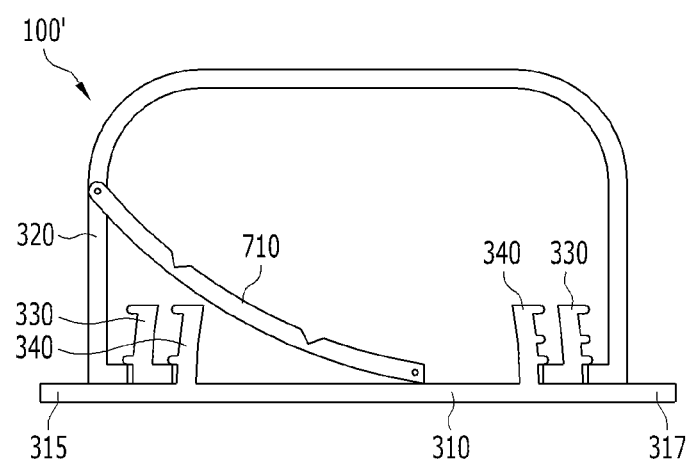
FIGS. 13 and 14 are vertical cross-sectional views for explanation of the mouse of FIGS. 11 and 12.
Figure 14:
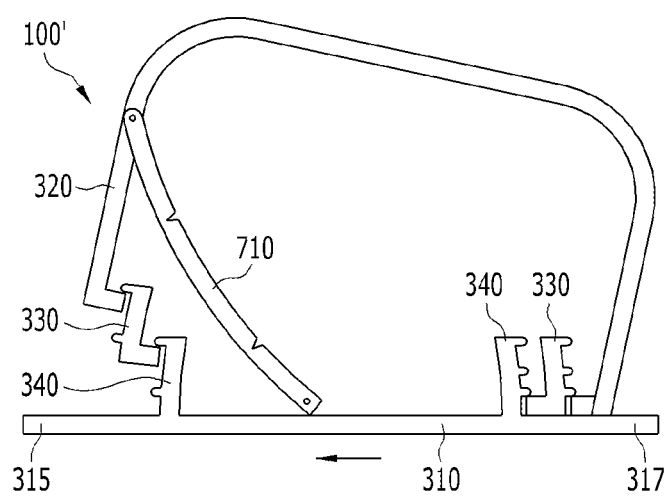

FIGS. 11 and 12 are horizontal cross-sectional views for explanation of a mouse 100″ with an adjustable angle according to another embodiment of the present invention. FIGS. 13 and 14 are vertical cross-sectional views for explanation of the mouse 100″ of FIGS. 11 and 12.

Referring to FIGS. 1 to 14, the mouse 100″ of FIGS. 11 to 14 may be formed by adding a first height adjuster 1110, a second height adjuster 1120, and a third height adjuster 1130 to the mouse 100 described with reference to FIGS. 1 to 6. That is, the configuration of the mouse 100″ is similar to the mouse 100 described with reference to FIGS. 1 to 6 except for the first to third height adjusters 1110, 1120, and 1130 and, thus, a repeated description will not be given hereinafter.

The first height adjuster 1110 may be formed to extend toward the other end of the upper body 320 from one end, may have one end coupled to an internal side of the other end of the upper body 320, and may be inclined to an upward direction of the lower body 310. The first height adjuster 1110 is the same as the first height adjuster 710 described with reference to FIGS. 7 to 10 and, thus, a repeated description will be replaced with the description of FIGS. 7 to 10. The second height adjuster 1120 may have one end coupled to the other end of the first height adjuster 1110 and may be coupled to an upper portion of the lower body 310 so as to be moveable between one end and the other end of the upper body 320. In addition, the third height adjuster 1130 may have one end coupled to the other end of the second height adjuster 1120 and the other end that protrudes out of the upper body 320 and may control the second height adjuster 1120 to be moved between one end and the other end of the upper body 320 using the other end that protrudes out of the upper body 320. For example, the third height adjuster 1130 may be a rotating screw that just rotates at the same position based on a predetermined rotating shaft and the second height adjuster 1120 may be a moving screw that is engaged with an upper surface of the rotating screw and moved between one end and the other end of the upper body 320 when the rotating screw rotates. Although not illustrated, the second height adjuster 1120 may be moved along a guide rail formed on an upper surface of the lower body 310.

By virtue of the first to third height adjusters 1110, 1120, and 1130 with this configuration, the angle of the mouse 100″ may be adjusted. That is, when the second height adjuster 1120 is moved between one end and the other end of the upper body 320 using the third height adjuster 1130, the other end of the first height adjuster 1110 may be moved up and down so as to move the upper body 320 in an upward direction or a downward direction.

For example, FIGS. 11 and 13 illustrate a state in which the angle of the mouse 100″ is not adjusted and FIGS. 12 and 14 illustrate a state in which the angle of the mouse 100″ is adjusted. First, referring to FIGS. 11 and 13, the second height adjuster 1120 may be overall positioned in a direction (a right direction of FIG. 11) of one end of the upper body 320, and the first height adjuster 1110 connected to one end of the second height adjuster 1120 may maintain an angle between the first height adjuster 1110 and the lower body 310 as a minimum angle, as illustrated in FIG. 13. In this state, in order to adjust the angle of the mouse 100″, when the second height adjuster 1120 is moved in a direction (a left direction in FIG. 7 or 8) of the other end of the upper body 320 using the third height adjuster 1130, the first height adjuster 1110 connected to one end of the second height adjuster 1120 may be moved upward so as to move the upper body 320 upward. In addition, when the upper body 320 is coupled to the angle adjusting body 330 through a coupler and then the first height adjuster 1110 is continuously moved upward, the angle adjusting body 330 coupled to the upper body 320 may be moved upward. Accordingly, the angle adjusting body 330 as well as the upper body 320 may be moved upward by moving the upper body 320 upward using the first to third height adjusters 1110, 1120, and 1130 and, thus, the mouse 100″ may be adjusted and used at a desired angle. The first height adjuster 1110 may include a plurality of grooves formed on an upper surface thereof and formed of a flexible material, which has been described in detail with reference to FIGS. 7 to 10 and, thus, a repeated description thereof will be omitted hereinafter.

In the embodiment of FIGS. 1 to 6, when the angle of the mouse 100 is adjusted, the upper body 320 or the angle adjusting body 330 may not be maintained with an adjusted angle and may fall toward the lower body 310 and, thus, the first protrusions 332 and 342 may be formed. However, in the case of the embodiment of FIGS. 11 to 14, the height of the upper body 320 and the angle adjusting body 330 may be adjusted using the first to third height adjusters 1110, 1120, and 1130 and the state in which the height is adjusted may be fixed by the first to third height adjusters 1110, 1120, and 1130 and, thus, the angle adjusting body 330 and the internal body 340 may include the first protrusions 332 and 342 of FIGS. 1 to 6 but the first protrusions 332 and 342 may be omitted as illustrated in FIGS. 11 to 14.

Figure 15:
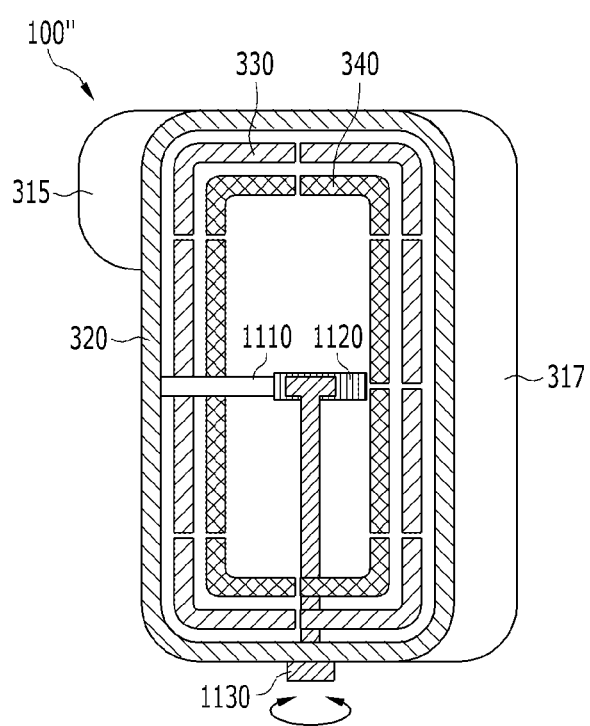
FIGS. 15 to 17 are horizontal cross-sectional views for explanation of a mouse with an adjustable angle according to another embodiment of the present invention.
Figure 16:
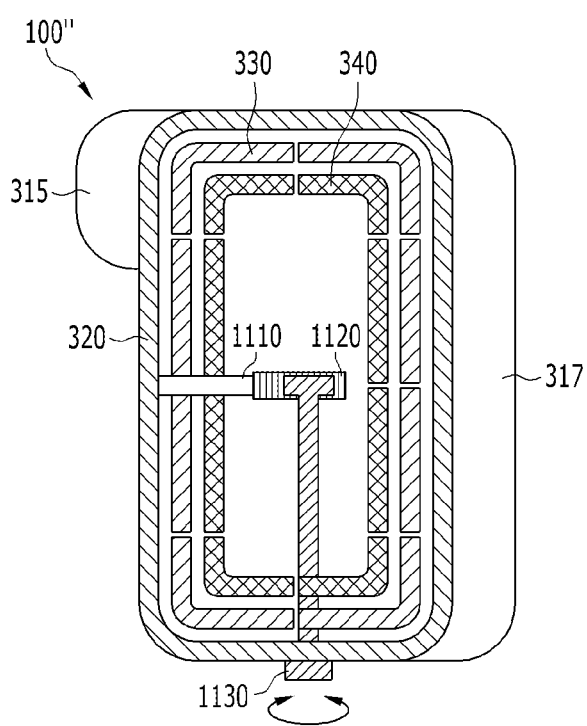
Figure 17:
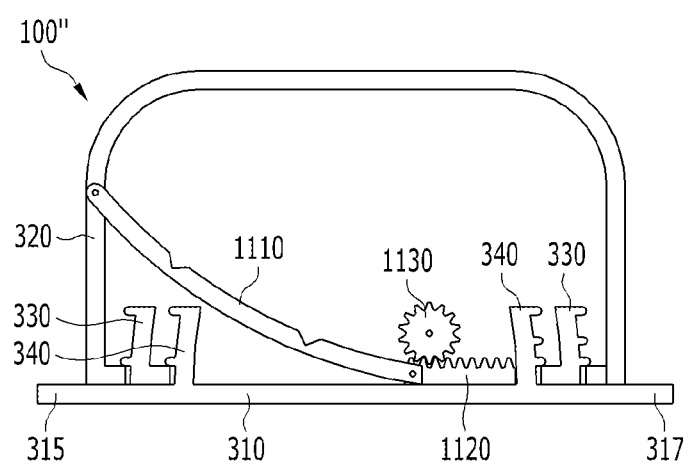
Figure 18:
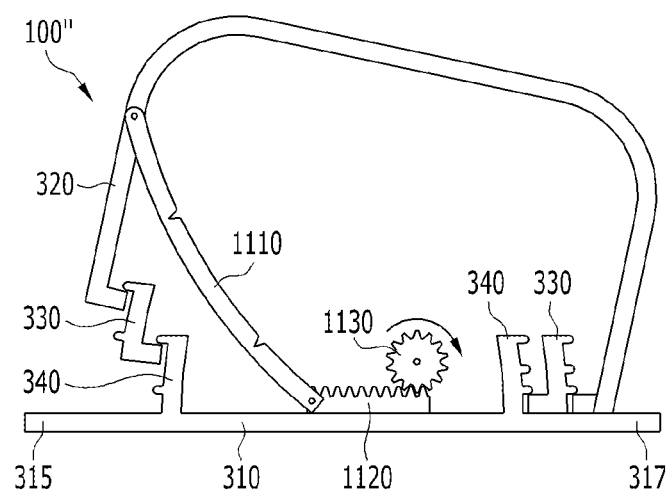
FIG. 18 is a horizontal cross-sectional view for explanation of the mouse of FIGS. 15 to 17.

FIGS. 15 to 17 are horizontal cross-sectional views for explanation of a mouse 100‴ with an adjustable angle according to another embodiment of the present invention. FIG. 18 is a horizontal cross-sectional view for explanation of the mouse 100‴ of FIGS. 15 to 17.

Referring to FIGS. 1 to 18, FIGS. 1 to 14 illustrate an embodiment in which the angle adjusting body 330 and the internal body 340 are each formed like a loop, and FIGS. 15 to 18 illustrate an embodiment in which the angle adjusting body 330 and the internal body 340 may each have one open surface. That is, FIGS. 1 to 14 illustrate an embodiment in which the angle adjusting body 330 and the internal body 340 are formed to surround an entire internal side of the upper body 320, and FIGS. 15 to 18 illustrate an embodiment in which the angle adjusting body 330 and the internal body 340 are formed to surround a portion of an internal side of the upper body 320. In the embodiment of FIGS. 15 to 18, a plurality of fixing elements 1710 and 1720 may be formed in order to fix the angle adjusting body 330 and the internal body 340. For example, the fixing elements 1710 and 1720 may be coupled to the angle adjusting body 330 and the internal body 340 and may not be coupled to the upper body 320. In addition, the embodiment of FIGS. 7 to 10 and the embodiment of FIGS. 11 to 14 may also be applied in the same way to the embodiment of FIGS. 15 to 18, which has been described with reference to the corresponding drawings and, thus, a repeated description will be omitted hereinafter.

While the present invention has been particularly shown and described with reference to exemplary embodiments thereof, it will be understood by those of ordinary skill in the art that various changes in form and details may be made therein without departing from the spirit and scope of the present invention as defined by the following claims.

MODE FOR INVENTION

Various embodiments have been described in the best mode for carrying out the invention.

The invention claimed is:

1. A mouse with an adjustable angle comprising a lower body that contacts a floor surface and an upper body that is coupled to an upper surface of the lower body so as to be held by a user hand, the mouse comprising:

an internal body coupled to an upper portion of the lower body in an inner space of the upper body;

a plurality of angle adjusting bodies coupled to the upper portion of the lower body to surround the internal body or another angle adjusting body and having one end fixedly coupled to the lower body and the other end detachably coupled to the lower body; and the upper body formed above the lower body so as to surround an angle adjusting body formed at an outermost portion among the angle adjusting bodies and having one end fixedly coupled to the lower body and the other end detachably coupled to the lower body, wherein, when the angle of the mouse is adjusted, while the other end of upper body is separated from the lower body to adjust a height of the mouse, the other end of upper body is coupled to the angle adjusting body formed at the outermost portion through a coupler or while the other end of the angle adjusting body is separated from the lower body to adjust the height of the mouse, the other end of the angle adjusting body is coupled to another angle adjusting body or the internal body formed inside the angle adjusting body through the coupler.

2. A mouse with an adjustable angle comprising a lower body that contacts a floor surface and an upper body that is coupled to an upper surface of the lower body so as to be held by a user hand, the mouse comprising:

an internal body coupled to an upper portion of the lower body in an inner space of the upper body;

an angle adjusting body coupled to the upper portion of the lower body to surround the internal body and having one end fixedly coupled to the lower body and the other end detachably coupled to the lower body; and the upper body formed above the lower body to surround the angle adjusting body and having one end fixedly coupled to the lower body and the other end detachably coupled to the lower body, wherein, when the angle of the mouse is adjusted, while the other end of upper body is separated from the lower body to adjust a height of the mouse, the other end of upper body is coupled to the angle adjusting body through a coupler or while the other end of the angle adjusting body is separated from the lower body to adjust the height of the mouse, the other end of the angle adjusting body is coupled to the internal body through the coupler.

3. The mouse according to claim 1, wherein the coupler comprises:

a projection formed inside the upper body and the other end of the angle adjusting body; and a plurality of protrusions formed outside the internal body and the other end of angle adjusting body.

4. The mouse according to claim 3, wherein:

the protrusions comprise at least one first protrusion for supporting the projection so as not to fall toward the lower body when the angle adjusting body or the upper body is lifted, and at least one second protrusion for preventing the projection from being separated upward when the angle adjusting body or the upper body is lifted; and the second protrusion is positioned above the first protrusion and an interval between the first protrusion and the second protrusion is the same as a height of the projection or greater than the height of the projection.

5. The mouse according to claim 3, wherein the protrusions further comprise a fixing protrusion for preventing the projection from being separated upward while the angle adjusting body or the upper body contacts the lower body when the angle adjusting body or the upper body is not lifted.

6. The mouse according to claim 1, wherein portions of the upper body, the angle adjusting body, and the internal body, which are to be coupled to the internal body, are formed of a flexible material so as to change a coupling angle between the upper body, the angle adjusting body, or the internal body and the lower body when the angle of the mouse is adjusted.

7. The mouse according to claim 1, wherein the internal body and the angle adjusting body are formed to surround an entire portion or partial portion of an internal side of the upper body.

8. The mouse according to claim 1, wherein the lower body further comprises at least one of:

a pushing portion formed to extend on the lower body in an outward direction of one end of the upper body; and a support formed to extend on the lower body in an outward direction of the other end of the upper body.

9. The mouse according to claim 1, further comprising:

a first height adjuster formed toward the other end of the upper body from one end, having one end coupled to an internal side in a direction of the other end of the upper body, and inclined in an upward direction of the lower body; and a second height adjuster having one end coupled to the other end of the first height adjuster and the other end protruding out of the upper body, wherein, when the other end of the second height adjuster is moved between one end and the other end of the upper body, the other end of the first height adjuster is moved up and down so as to move the upper body in an upward direction or a downward direction.

10. The mouse according to claim 9, wherein the first height adjuster comprises a plurality of grooves formed on an upper surface thereof.

11. The mouse according to claim 1, further comprising:

a first height adjuster formed toward the other end of the upper body from one end, having one end coupled to an internal side in a direction of the other end of the upper body, and inclined in an upward direction of the lower body;

a second height adjuster having one end coupled to the other end of the first height adjuster and coupled to an upper portion of the lower body so as to be moveable between one end and the other end of the upper body; and a third height adjuster having one end coupled to the other end of the second height adjuster and the other end protruding out of the upper body and controlling the second height adjuster to be moved between one end and the other end of the upper body using the other end that protrudes out of the upper body, wherein, when the second height adjuster is moved between one end and the other end of the upper body using the third height adjuster, the other end of the first height adjuster is moved up and down so as to move the upper body in an upward direction or a downward direction.

12. The mouse according to claim 11, wherein:

the third height adjuster is a rotating screw that rotates at the same position; and the second height adjuster is a moving screw that is engaged with an upper surface of the rotating screw and moved between one end and the other end of the upper body when the rotating screw rotates.

13. The mouse according to claim 2, wherein the coupler comprises:
   a projection formed inside the upper body and the other end of the angle adjusting body; and
   a plurality of protrusions formed outside the internal body and the other end of angle adjusting body.

14. The mouse according to claim 13, wherein:
   the protrusions comprise at least one first protrusion for supporting the projection so as not to fall toward the lower body when the angle adjusting body or the upper body is lifted, and at least one second protrusion for preventing the projection from being separated upward when the angle adjusting body or the upper body is lifted; and
   the second protrusion is positioned above the first protrusion and an interval between the first protrusion and the second protrusion is the same as a height of the projection or greater than the height of the projection.

15. The mouse according to claim 13, wherein the protrusions further comprise a fixing protrusion for preventing the projection from being separated upward while the angle adjusting body or the upper body contacts the lower body when the angle adjusting body or the upper body is not lifted.

16. The mouse according to claim 2, wherein portions of the upper body, the angle adjusting body, and the internal body, which are to be coupled to the internal body, are formed of a flexible material so as to change a coupling angle between the upper body, the angle adjusting body, or the internal body and the lower body when the angle of the mouse is adjusted.

17. The mouse according to claim 2, wherein the internal body and the angle adjusting body are formed to surround an entire portion or partial portion of an internal side of the upper body.

18. The mouse according to claim 2, wherein the lower body further comprises at least one of:
   a pushing portion formed to extend on the lower body in an outward direction of one end of the upper body; and
   a support formed to extend on the lower body in an outward direction of the other end of the upper body.

19. The mouse according to claim 2, further comprising:
   a first height adjuster formed toward the other end of the upper body from one end, having one end coupled to an internal side in a direction of the other end of the upper body, and inclined in an upward direction of the lower body; and
   a second height adjuster having one end coupled to the other end of the first height adjuster and the other end protruding out of the upper body,
   wherein, when the other end of the second height adjuster is moved between one end and the other end of the upper body, the other end of the first height adjuster is moved up and down so as to move the upper body in an upward direction or a downward direction.

20. The mouse according to claim 19, wherein the first height adjuster comprises a plurality of grooves formed on an upper surface thereof.

21. The mouse according to claim 2, further comprising:
   a first height adjuster formed toward the other end of the upper body from one end, having one end coupled to an internal side in a direction of the other end of the upper body, and inclined in an upward direction of the lower body;
   a second height adjuster having one end coupled to the other end of the first height adjuster and coupled to an upper portion of the lower body so as to be moveable between one end and the other end of the upper body; and
   a third height adjuster having one end coupled to the other end of the second height adjuster and the other end protruding out of the upper body and controlling the second height adjuster to be moved between one end and the other end of the upper body using the other end that protrudes out of the upper body,
   wherein, when the second height adjuster is moved between one end and the other end of the upper body using the third height adjuster, the other end of the first height adjuster is moved up and down so as to move the upper body in an upward direction or a downward direction.

22. The mouse according to claim 21, wherein:
   the third height adjuster is a rotating screw that rotates at the same position; and
   the second height adjuster is a moving screw that is engaged with an upper surface of the rotating screw and moved between one end and the other end of the upper body when the rotating screw rotates.

* * * * *